United States Patent
Moyer

(10) Patent No.: US 9,238,280 B2
(45) Date of Patent: Jan. 19, 2016

(54) DUAL SHIFT UNIT FOR WELDER

(71) Applicant: Michael B. Moyer, Moody, AL (US)

(72) Inventor: Michael B. Moyer, Moody, AL (US)

(73) Assignee: Honda Motor Co., Ltd., Tokyo (JP)

(*) Notice: Subject to any disclaimer, the term of this patent is extended or adjusted under 35 U.S.C. 154(b) by 167 days.

(21) Appl. No.: 13/939,713

(22) Filed: Jul. 11, 2013

(65) Prior Publication Data

US 2014/0263576 A1   Sep. 18, 2014

Related U.S. Application Data

(60) Provisional application No. 61/793,040, filed on Mar. 15, 2013.

(51) Int. Cl.
*B23K 37/04* (2006.01)
*B23K 31/02* (2006.01)

(52) U.S. Cl.
CPC ............. *B23K 37/0452* (2013.01); *B23K 31/02* (2013.01); *B23K 37/0461* (2013.01); *B23K 2201/006* (2013.01)

(58) Field of Classification Search
None
See application file for complete search history.

(56) References Cited

U.S. PATENT DOCUMENTS

| | | | |
|---|---|---|---|
| 3,170,322 A | 2/1965 | Cavanaugh | |
| 3,588,418 A * | 6/1971 | Chiffey | 219/98 |
| 4,121,084 A * | 10/1978 | Wear | B23K 9/095 |
| | | | 219/125.1 |
| 4,315,129 A * | 2/1982 | Wilkinson et al. | 219/99 |
| 4,647,097 A | 3/1987 | Lessway | |
| 4,691,905 A | 9/1987 | Tamura et al. | |
| 4,723,806 A | 2/1988 | Yuda | |
| 4,728,137 A | 3/1988 | Hamed et al. | |
| 4,913,481 A | 4/1990 | Chin et al. | |
| 5,111,019 A | 5/1992 | Torii et al. | |
| 5,938,257 A | 8/1999 | Blatt | |
| 5,967,581 A | 10/1999 | Bertini | |
| 6,471,200 B2 | 10/2002 | Maffeis | |
| 6,512,194 B1 | 1/2003 | Koshurba et al. | |
| 7,232,974 B2 * | 6/2007 | Watanabe | B23K 9/0286 |
| | | | 219/125.11 |
| 7,363,799 B2 | 4/2008 | Hamm et al. | |
| 8,237,078 B2 | 8/2012 | Yasunaga et al. | |
| 2011/0017710 A1 * | 1/2011 | Yasunaga et al. | 219/87 |

* cited by examiner

*Primary Examiner* — Devang R Patel
(74) *Attorney, Agent, or Firm* — Arent Fox LLP

(57) ABSTRACT

A welding apparatus includes a first welding element, a second welding element and a support on which the first welding element and the second welding element are mounted and which is movable relative to the welding apparatus. The support is configured to move the first welding element and the second welding element respectively from a first start position to a first end position and from a second start position to a second end position as the support is moved such that welding points of the first welding element and the second welding element are altered. The first welding element and the second welding element are oriented to mirror one another at the first start position and at the second start position. The first welding element and the second welding element are oriented to mirror one another at the first end position and at the second end position.

15 Claims, 5 Drawing Sheets

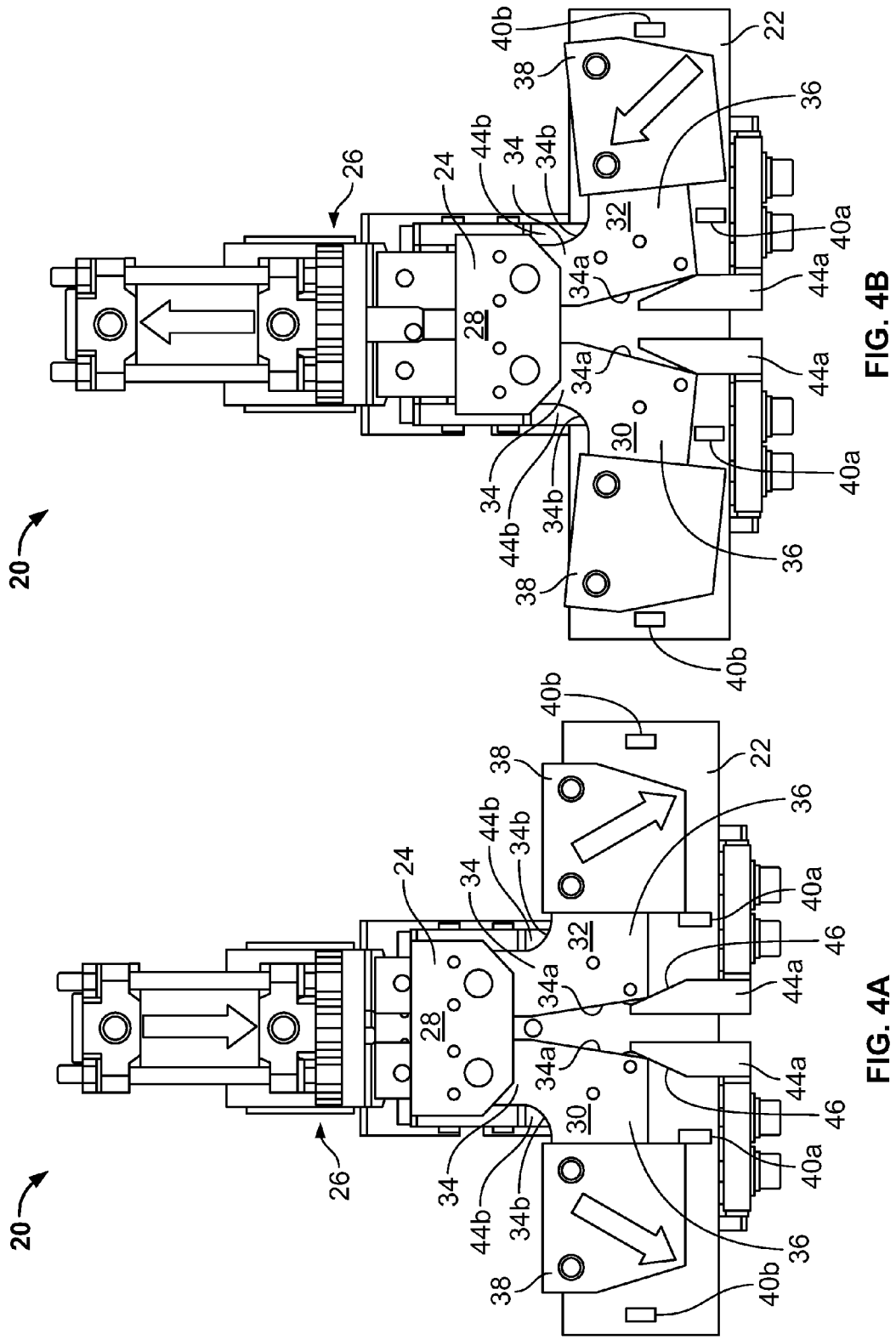

DUAL SHIFT UNIT FOR WELDER

CROSS-REFERENCE TO RELATED APPLICATIONS

This application claims the benefit of U.S. Provisional Application No. 61/793,040, filed Mar. 15, 2013, the entire disclosure of which is hereby incorporated herein by reference.

BACKGROUND

The present disclosure relates to manufacturing apparatuses and processes and, more specifically, to welding apparatuses and processes.

When components are manufactured in mass, it is commonplace to use a single manufacturing apparatus for variations of a single component. For example, the manufacturing apparatus may be equipped with features that allow certain parameters to be adjusted in accordance with the specifications for a given variation of the component. However, there may be a variation of the component that cannot be manufactured by manipulation of the adjustable parameters and it may be necessary to design a mechanism that alters the single manufacturing apparatus specifically for this variation of the component.

SUMMARY

In one example aspect, a welding apparatus includes a first welding element, a second welding element and a support on which the first welding element and the second welding element are mounted. The support is configured to be movable relative to the welding apparatus. The support is configured to move the first welding element and the second welding element respectively from a first start position to a first end position and from a second start position to a second end position as the support is moved relative to the welding apparatus such that welding points of the first welding element and the second welding element are altered. The first welding element and the second welding element are oriented to mirror one another at the first start position and at the second start position. The first welding element and the second welding element are oriented to mirror one another at the first end position and at the second end position.

In another example aspect, a method of operating a welding apparatus is provided. The welding apparatus includes a first welding element and a second welding element. The first welding element corresponds to a first welding point and the second welding element corresponds to a second welding point. The first welding point and the second welding point are located symmetrically with respect to a plane centered between the first welding element and the second welding element. The method includes a step of moving the first welding element and the second welding element from a first start position to a first end position and from a second start position and second end position respectively such that the first welding point and the second welding point are altered symmetrically.

In yet another example aspect, a method of operating a welding apparatus is provided. The welding apparatus includes a first welding element and a second welding element. The first welding element corresponds to a first initial welding point and the second welding element corresponds to a second initial welding point. The first welding point and the second welding point are located symmetrically with respect to a plane centered between the first welding element and the second welding element. The method including steps of coupling the first welding element and the second welding element operatively to a moving element and moving the element in a first direction along a line. The first initial welding point and the second initial welding point are altered to a first altered welding point and a second altered welding point respectively after the element is moved along the line, and the first altered welding point and the second altered welding point are located symmetrically with respect to the plane.

BRIEF DESCRIPTION OF THE DRAWINGS

These and other aspects are better understood when the following detailed description is read with reference to the accompanying drawings, in which:

FIG. 4A is top view of the substructure with a first welding element and a second welding element in a first start position and a second start position respectively;

FIG. 4B is a top view of the substructure with the first welding element and the second welding element in a first end position and a second end position;

DETAILED DESCRIPTION

Figure 1:
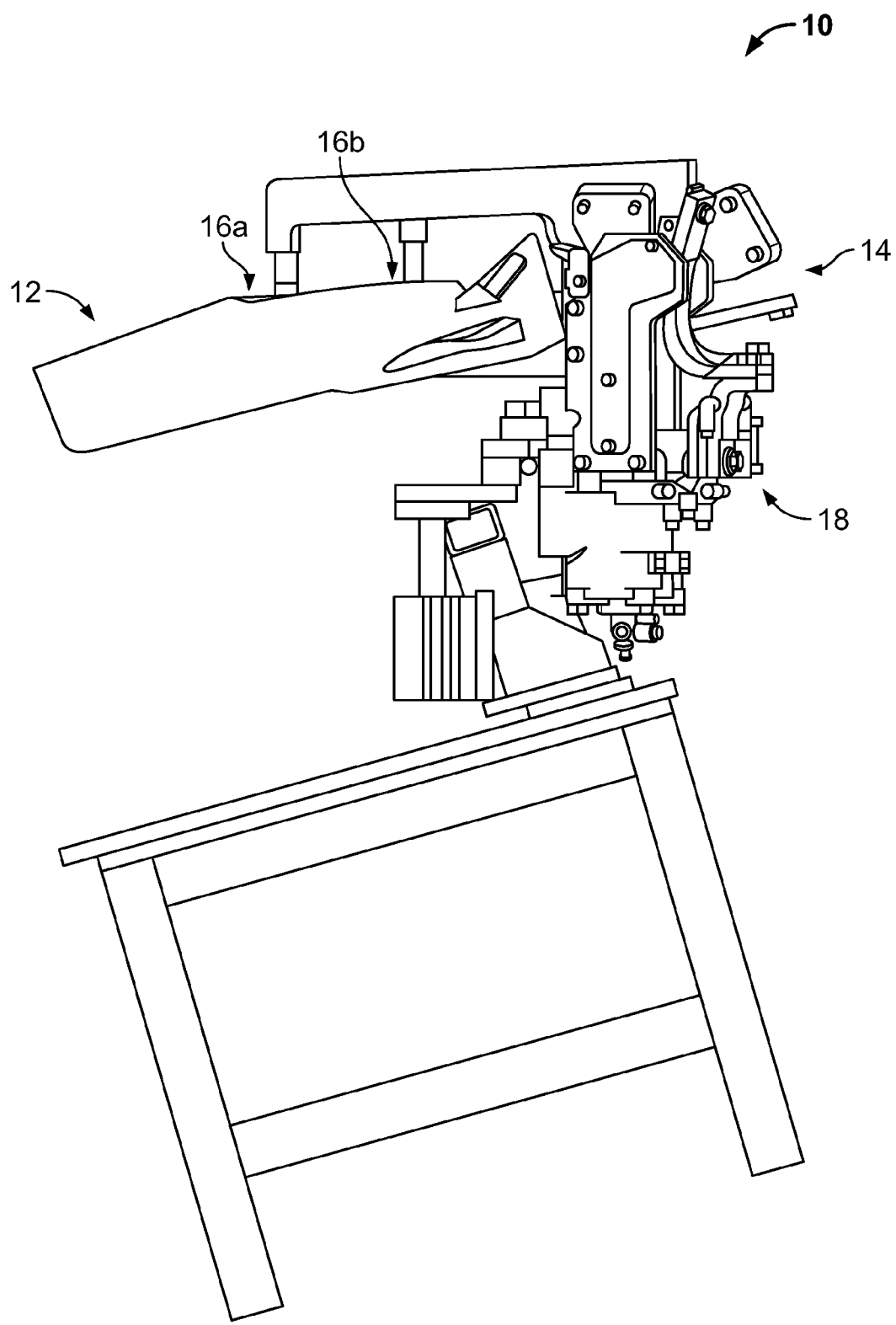
FIG. 1 is a side view of an example embodiment of a welding apparatus with an example work piece secured thereto.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Figure 2:
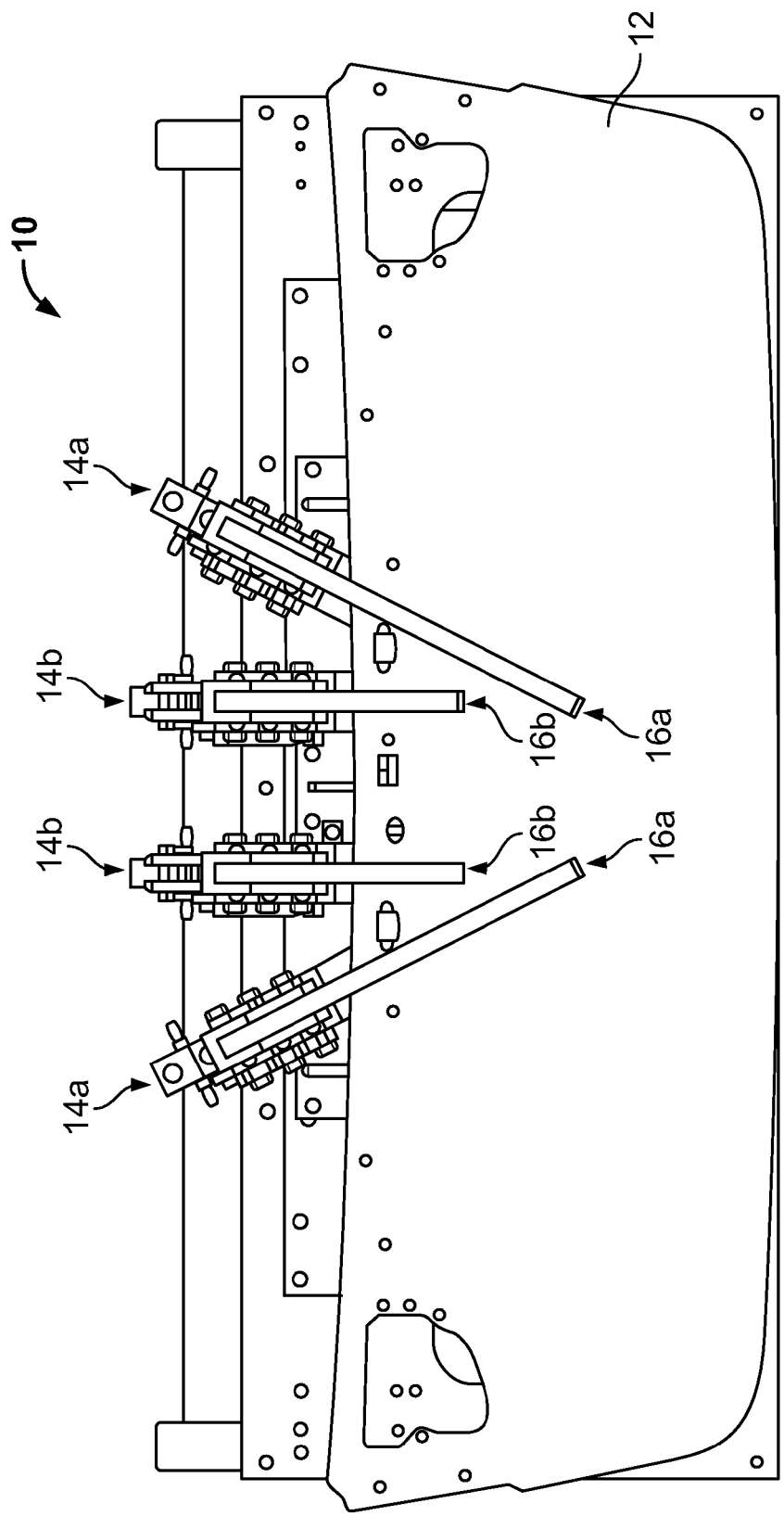
FIG. 2 is a top view of the example welding apparatus with welding elements positioned over the work piece.

Referring now to FIGS. 1-2, an example embodiment of a welding apparatus 10 is illustrated with an example embodiment of a work piece 12 processed by the welding apparatus 10. Certain features of the welding apparatus 10 may be omitted from FIGS. 1-2 in order to illustrate other features with clarity. The welding apparatus 10 may include a table-like foundation on which the welding features are mounted and may include means to secure the work piece 12 to the welding apparatus 10 (e.g., a clamp) so that the work piece can be processed or worked on in a stable manner. Specifically, the welding apparatus 10 may include locking means to immobilize the work piece 12 for processing as shown in FIG. 1.

The welding apparatus 10 may include a plurality of welding elements 14 (e.g., welding guns). The welding elements 14 may be configured to be movable about the welding apparatus 10 so that the welding elements 14 do not interfere with the locking of the work piece 12 onto the welding apparatus 10. For example, the welding elements 14 may be pivoted upward to allow the work piece 12 to be locked and may be pivoted downward for processing. In the example embodiment, there are two pairs of symmetrically arranged welding elements 14, i.e., a pair of outer welding elements 14a and a pair of inner welding elements 14b. All of the welding elements 14 are disposed and oriented so as to mirror one another. In the embodiment of FIG. 1, the inner welding elements 14b are disposed symmetrically and substantially parallel with one another and the outer welding elements 14a are disposed symmetrically at an angle about the inner welding elements 14b. In this example, each of the welding elements 14 is configured to form a weld at a welding point 16a or 16b on the work piece 12. As shown in FIGS. 1, 2 and 5A-5B, the welding points 16a formed by the outer welding elements 14a are symmetrical to one another and the welding points 16b formed by the inner welding elements 14b are symmetrical to one another. The symmetry of the aforementioned features is with respect to a plane that is centered between the inner welding elements 14b and extends through the work piece 12 in FIG. 2.

In the following description, the term "inner" refers to regions closer to this plane whereas the term "outer" refers to regions farther from this plane. Moreover, the terms "symmetrical" or "mirror" relate to the overall orientations of the welding elements 14 and are not meant to denote that two symmetrically arranged welding elements 14 are exact mirror images of one another such that there is a symmetrically disposed counterpart feature on a welding element 14 for each corresponding feature on the other welding element 14. For example, the location of a screw mounted on one inner welding element 14b may not be symmetrical on the symmetrically disposed inner welding element 14b although the orientations of the welding elements 14 may be symmetrical.

Figure 3B:
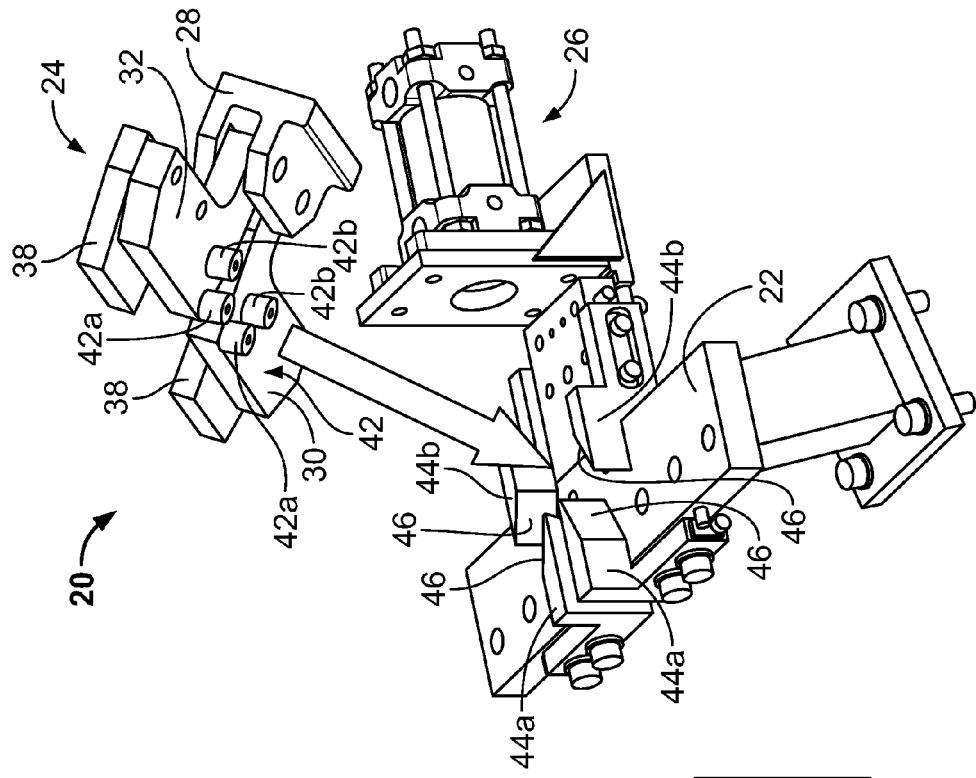
FIG. 3B is a side perspective view of the substructure with the support detached from the platform.
Figure 3A:
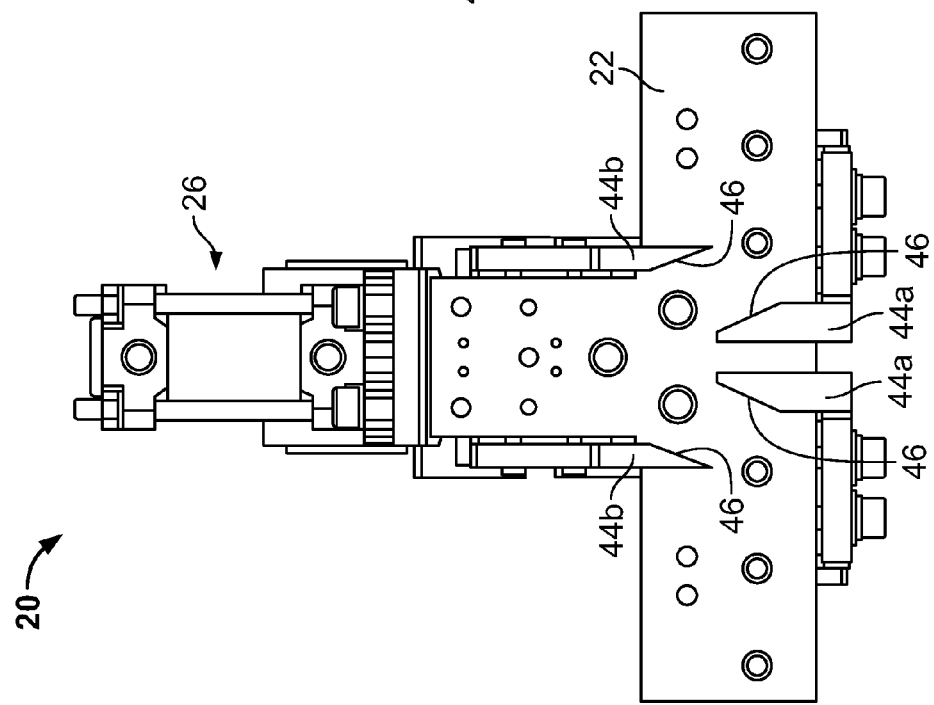
FIG. 3A is a top view of an example embodiment of a substructure including a platform shown without a support.

Each of the welding elements 14 includes a base 18 (FIG. 1) by which the welding element 14 may be mounted directly or indirectly onto the welding apparatus 10. FIGS. 3A-3B show an example embodiment of a substructure 20 which is mounted on the welding apparatus 10 and which may support the base 18 of one or more welding elements 14. In this example embodiment, the substructure 20 is configured to support only the inner welding elements 14b.

The substructure 20 may include a platform 22 and a support 24 which may be movably mounted relative to the platform 22 and consequently to the welding apparatus 10. Movement of the support 24 results in the base of the welding element 14 being moved relative to the welding apparatus 10. The support 24 may be operatively connected to the platform 22 via a reciprocating element 26 (e.g., a piston) which is configured to move the support 24 a given distance in a first direction and the same given distance in an opposite, second direction along a line (as indicated by the arrows in FIGS. 4A and 4B) and along a surface of the platform 22. The reciprocating element 26 may be operated using a fluid and thus may be of a pneumatic type, hydraulic type or the like.

The support 24 may include a hub 28, and a first member 30 and a second member 32 that are pivotably coupled to the hub 28. In this embodiment, the first and second members 30, 32 are L-shaped with a proximal portion 34 by which the first and second members are coupled to the hub 28 and a distal portion 36 that may extend away from the proximal portion 34. The first and second members 30, 32 are disposed in a symmetrical manner in this embodiment such that the distal portions 36 of the L-shape extend away from one another. A plate 38 may be attached on one side of the members 30, 32 (e.g., top) at the distal portion 36 so that the base 18 of the welding elements 14 can be placed on top of the plate 38.

The first member 30 and the second member 32 may assume initial positions (FIG. 4A) when the reciprocating element 26 is in a fully retracted state and may assume final positions (FIG. 4B) when the reciprocating element 26 is in a fully extended state. The proximal portions 34 of the first and second members 30, 32 are substantially parallel in the initial positions and are flared outward with respect to the hub 28 in the final positions. The positions of the welding elements 14 corresponding to the initial positions of the first member 30 and the second member 32 can be referred to as the start positions. The positions of the welding elements 14 corresponding to the final positions of the first member 30 and the second member 32 can be referred to as the end positions.

Alternatively, the initial and final positions may not correspond to fully retracted or extended states of the reciprocating element 26 and the platform 22 may provide projections or stoppers 40a, 40b to limit a range of movement of the plates 38 (or the first and second members 30, 32) and to catch the plates 38 (or the first member 30 and the second member 32) at the start positions and the end positions.

As shown in FIG. 3B, one or more wheels 42 may be attached on the other side of the members 30, 32 (e.g., bottom) at the distal portion 36 and may be configured to interact with guiding protrusions 44 formed on the platform 22. The guiding protrusions 44 on the platform 22 are configured to be engaged by the wheels 42 on the first and second members 30, 32 during movement of the support 24 in the first and second directions. Specifically, the wheels 42 may include first wheels 42a and second wheels 42b as shown in FIG. 3B. The first wheels 42a may be located closer with one another than the second wheels 42b are with one another. The first wheel 42a may be located at an inner part of the base 18 (e.g., near an inner edge 34a (FIGS. 4A-4B) of each proximal portion 34 of the first and second members 30, 32) while the second wheel 42b may be located at an outer part of the base 18 (e.g., farther from the inner edge 34a of each proximal portion 34 of the first and second members 30, 32 than the first wheel 42a). In the embodiment of FIG. 3A, the guiding protrusions 44 may include first guiding protrusions 44a and second guiding protrusions 44b. The guiding protrusions 44 may be blocks formed on the surface of the platform 22. As shown in FIG. 3A, the first guiding protrusion 44a are symmetrical with one another while the second guiding protrusion 44b are symmetrical with one another.

The first guiding protrusion 44a may be located on the platform 22 so as to intersect a path of the first wheel 42a (and consequently the base 18 of the welding element 14) as the support 24 is moved in the first direction. The second guiding protrusions 44b may be located on the platform 22 so as to intersect a path of the second wheel 42b (and consequently the base 18 of the welding element 14) as the support 24 is moved in the second direction. Moreover, each of the first guiding protrusions 44a may include a slanted surface 46 configured to be engaged by the first wheel 42a as shown in FIG. 3A. The slanted surfaces 46 of the first guiding protrusions 44a are oriented to face away from one another. Each of the second guiding protrusions 44b may include a slanted surface 46 configured to be engaged by the second wheel 42b as shown in FIG. 3A. The slanted surfaces 46 of the second guiding protrusions 44b are oriented to face one another.

Figure 5A:
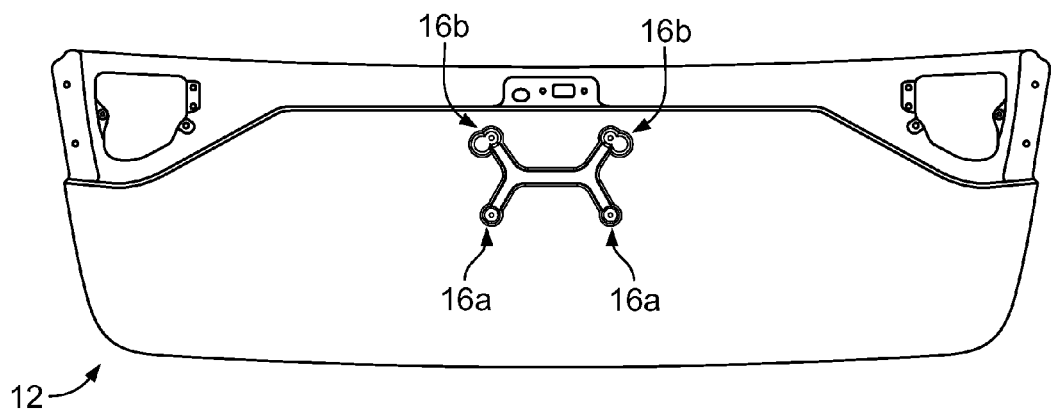
FIG. 5A is a top view of the work piece after processing with the support in the first position.
Figure 5B:
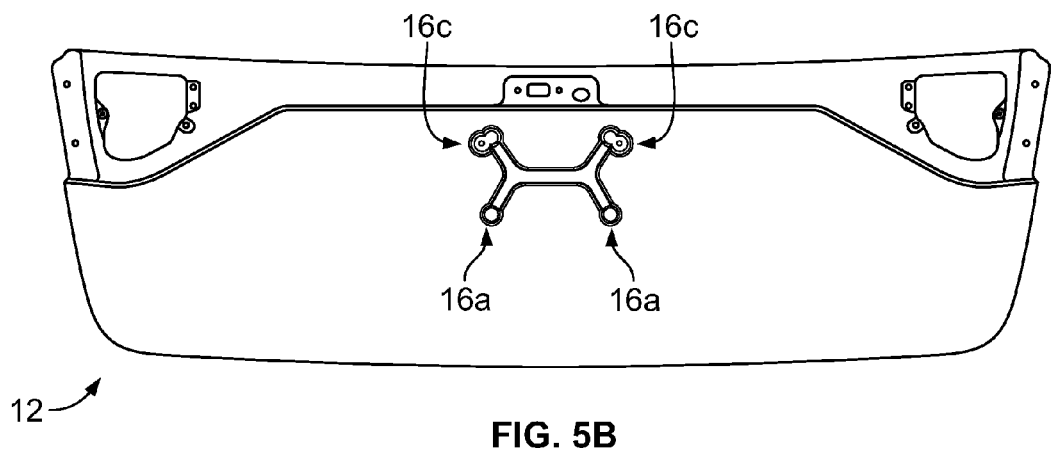
FIG. 5B is a top view of the work piece after processing with the support in the second position.

The aforementioned configuration of the welding apparatus 10 is used to alter the welding points 16b of the inner welding elements 14b in a symmetric manner from the locations shown in FIG. 5A to the locations 16c shown in FIG. 5B. Specifically, when the first member 30 and the second member 32 are moved from the initial positions (shown in FIG. 4A) to the final positions (shown in FIG. 4B), the welding elements 14 are moved respectively from the start positions to the end positions. Once the first member 30 and the second member 32 have reached the final positions, the welding elements 14 are aimed at the welding points 16c shown in FIG. 5B. When the first member 30 and the second member 32 are moved from the final positions to the initial positions, the welding elements 14 are moved respectively from the end positions to the start positions. Once the first member and the second member 32 have reached the initial positions, the welding elements 14 are aimed at the welding points 16b shown in FIG. 5A.

The above described welding apparatus 10 allows for the orientations of the welding element 14 on the left (i.e., a first welding element 14b) and the welding element 14 on the right (i.e., a second welding element 14b) to mirror one another at both of the initial positions and the final positions and dispenses of the need to individually calibrate the welding points 16b of the welding elements 14b.

The work piece 12 may be a part for an automobile such as a tailgate and welds may need to be formed on the tailgate to enable mounting of a license plate nut on the tailgate. License plates of difference countries may vary in dimensions and it may be necessary to form welds at different locations of the tailgate while keeping the welds at symmetrical locations.

In order to adjust the initial welding points 16b of the inner welding elements 14b, the welding apparatus 10 may be operated in the following manner. While the bases 18 of the welding elements 14b are mounted on the plates 38 of the first and second members 30, 32 with the welding elements 14b at the start positions, the support 24 is moved in the first direction toward the end positions by the extension of the reciprocating element 26 in order to form welds at altered welding points 16c according to a first specification. As the support 24 is moved in the first direction, the first wheels 42a contact and roll against the slanted surface 46 of the first guiding protrusions 44a until the stoppers 40b located at outer regions of the platform 22 restrict the movement of the first and second members 30, 32 or until the reciprocating element 26 reaches the fully extended state. In order to form welds at initial welding points 16b according to a second specification, the support 24 is moved in the second direction and the welding elements 14b are moved toward the start positions by the refraction of the reciprocating element 26. As the support 24 is moved in the second direction, the second wheels 42b contact and roll against the slanted surface 46 of the second guiding protrusions 44b until the stoppers 40a located at inner regions of the platform 22 restrict the movement of the first and second members 30, 32 or until the reciprocating element 26 reaches the fully retracted state.

By pivoting the first and second members 30, 32, which support the bases 18 of the welding elements 14, about the hub 28, the orientation of the welding elements 14 can be altered in a controlled manner while maintaining symmetry between the orientations of the welding elements 14 and the welding points 16c of the first and second members 30, 32. The first guiding protrusions 44a and the second guiding protrusions 44b are located on the path of the bases 18 so as to guide the bases 18 of the first and second members 30, 32 during movement of the support 24 in the first and second directions. Specifically, the first guiding protrusions 44a are located between the bases 18 such that the first and second members 30, 32 are pivoted away from each other as the support 24 is moved in the first direction. The second guiding protrusions 44b are located laterally outward of the bases 18 such that the first and second members 30, 32 are pivoted toward each other as the support 24 is moved in the second direction.

It will be apparent to those skilled in the art that various modifications and variations can be made without departing from the spirit and scope of the claimed invention.

What is claimed is:

1. A welding apparatus including:
   a first welding element;
   a second welding element; and
   a support including a first member on which the first welding element is mounted and also including a second member on which the second welding element are mounted, the support being configured to be movable relative to the welding apparatus, the support being configured to move the first welding element and the second welding element respectively from a first start position to a first end position and from a second start position to a second end position as the support is moved relative to the welding apparatus such that welding points of the first welding element and the second welding element are altered; and
   a platform relative to which the support is moved, the platform including a reciprocating element configured to move the support in a first direction and an opposite, second direction, the platform including first guiding protrusions and second guiding protrusions, wherein
   each of the first member and the second member includes a first wheel and a second wheel, the first wheel configured to roll against the first guiding protrusion as the support is moved in the first direction, the second wheel configured to roll against the second guiding protrusion as the support is moved in the second direction, and wherein
   the first welding element and the second welding element are oriented to mirror one another at the first start position and at the second start position, and the first welding element and the second welding element are oriented to mirror one another at the first end position and at the second end position.

2. The welding apparatus of claim 1, wherein the first welding element and the second welding element are mounted on the first member and the second member respectively, the first member and the second member being oriented to mirror one another.

3. The welding apparatus of claim 2, wherein the first welding element and the second welding element are configured to be moved toward the first end position and the second end position respectively in the first direction, the first welding element and the second welding element being configured to be moved toward the first start position and the second start position in the second direction.

4. The welding apparatus of claim 3, wherein the first and the second members are configured to be guided by one of the first guiding protrusions as the support is moved in the first direction, the first and second members being configured to be guided by one of the second guiding protrusions as the support is moved in the second direction.

5. The welding apparatus of claim 4, the first wheels being located closer with one another than the second wheels are with one another, the first guiding protrusions being defined by first symmetrical blocks with first slanted surfaces that are oriented to face away from one another and are configured to be engaged by the first wheels, the second guiding protrusions being defined by second symmetrical blocks with second slanted surfaces that are oriented to face one another and are configured to be engaged by the second wheels.

6. The welding apparatus of claim 2, the support further including a hub, the first member and the second member pivotably coupled to the hub.

7. The welding apparatus of claim 3, the platform further including projections to catch plates or members respectively coupled to the first welding element and the second welding element at each of the first start position, the first end position, the second start position and the second end position.

8. The welding apparatus of claim 1, the first welding element in the first end position being rotated outward from the first start position, and the second welding element in the second end position being rotated outward from the second start position.

9. The welding apparatus of claim 1, the first welding element and the second welding element oriented to mirror one another during movement between the first start position and the first end position and between the second start position and the second end position respectively.

10. The welding apparatus of claim 1, the welding apparatus further including a clamp configured to secure a work piece with respect to the welding apparatus.

11. A welding apparatus including:
a first welding element configured to correspond to a first welding point;
a second welding element configured to correspond to a second welding point, the first welding point and the second welding point being located symmetrically with respect to a plane centered between the first welding element and the second welding element,
a support including a first member on which the first welding element is mounted and also including a second member on which the second welding element are mounted; and
a platform relative to which the support is moved, the platform including a reciprocating element configured to move the support in a first direction and an opposite, second direction, the platform including first guiding protrusions and second guiding protrusions, wherein
each of the first member and the second member includes a first wheel and a second wheel, the first wheel configured to roll against the first guiding protrusion as the support is moved in the first direction, the second wheel configured to roll against the second guiding protrusion as the support is moved in the second direction, and wherein
the first welding element and the second welding element are configured to move from a first start position to a first end position and from a second start position and second end position, respectively, such that the first welding point and the second welding point are altered symmetrically.

12. A welding apparatus including:
a first welding element configured to correspond to a first initial welding point;
a second welding element configured to correspond to a second initial welding point, the first initial welding point and the second initial welding point being located symmetrically with respect to a plane centered between the first welding element and the second welding element,
a support including a first member on which the first welding element is mounted and also including a second member on which the second welding element are mounted; and
a platform relative to which the support is moved, the platform including a reciprocating element configured to move the support in a first direction and an opposite, second direction, the platform including first guiding protrusions and second guiding protrusions, wherein
each of the first member and the second member includes a first wheel and a second wheel, the first wheel configured to roll against the first guiding protrusion as the support is moved in the first direction, the second wheel configured to roll against the second guiding protrusion as the support is moved in the second direction, and wherein
the first welding element and the second welding element operatively coupled to a moving element configured to move in a first direction along a line; and wherein
the first initial welding point and the second initial welding point are configured to correspond to a first altered welding point and a second altered welding point, respectively, after the element is moved along the line, such that the first altered welding point and the second altered welding point are located symmetrically with respect to the plane.

13. The apparatus of claim 12 configured such that moving the moving element in a second direction along the line causes the first altered welding point and the second altered welding point to converge on the first initial welding point and the second altered welding point after the element is moved in the second direction along the line.

14. The apparatus of claim 12, wherein the first welding element and the second welding element are configured to pivot with respect to the moving element and in directions opposite to one another.

15. The apparatus of claim 14, wherein the first welding element and the second welding element are configured to pivot away from one another as the element is moved in a first direction, and are configured to pivot toward one another as the element is moved in a second direction.

* * * * *